(No Model.)
E. L. BUDLONG.
BELT FASTENER.
No. 399,489.          Patented Mar. 12, 1889.
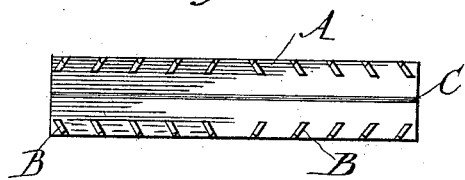
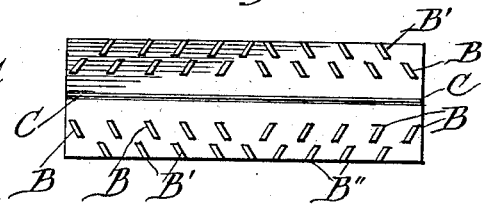
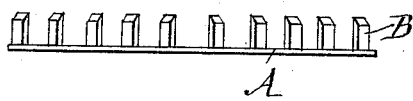
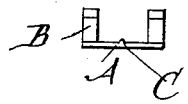
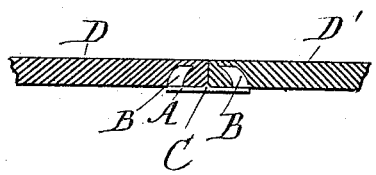
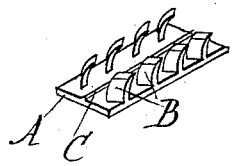
Witnesses:
Frank S. Blanchard
S. C. Stevens
Inventor:
E. L. Budlong
By A. M. Stout
Attorney.

UNITED STATES PATENT OFFICE.

EDWARD L. BUDLONG, OF BOWMANVILLE, ILLINOIS.

BELT-FASTENER.

SPECIFICATION forming part of Letters Patent No. 399,489, dated March 12, 1889.

Application filed December 10, 1888. Serial No. 293,179. (No model.)

*To all whom it may concern:*

Be it known that I, EDWARD L. BUDLONG, a citizen of the United States, residing at Bowmanville, in the county of Cook and State of Illinois, have invented a new and useful Improvement in Belt-Fasteners, of which the following is a specification.

My said invention will be hereinafter more fully described with reference to the accompanying drawings, in which—

Figure 1 represents a plan of my device, which consists of the plate A, which may be cast or made of malleable iron, or of any other suitable material, provided with a series of teeth, B, made of any suitable material, on the outer edge of the same, and a central slight ridge or mark, C, which serves as a guide in placing the two ends of the belt upon the plate when they are to be fastened in position; Fig. 2, a like view of the same, except that in this view there are two series of like teeth on each side edge of the plate; Fig. 3, a side edge view of the plate A with teeth extending up therefrom; Fig. 4, an end edge view of the plate with teeth extending upward from each side edge; Fig. 5, a longitudinal sectional view of the two ends of the belt abutting together on the plate A, with one tooth from each side of the plate embedded in the material of the ends of the belt, their points being bent diagonally across the meeting edges of the belt. The points are bent thus because of their chisel form in the act of forcing the ends of the belt down upon the teeth until they bury their entire lengths in the same; Fig. 6, a cross-section of one end of the belt on the plate, so taken as to expose to view an entire series of teeth embedded in the material of the belt, and Fig. 7 a perspective of a cross-section of the plate, showing the chisel form of the upper ends of the teeth and the hooked form the teeth will assume in the act of being forced into the material of the belt.

The teeth are so arranged upon the plate, beginning at each end of the same and terminating at its transverse axis, that each two teeth, standing upon opposite side edges of the plate and opposite to each other, would, if their inner edges were extended, meet at the long median line and form an angle more remote from its transverse axis than their bases. The teeth are broad, flat, and chisel-pointed, and stand with their faces diagonally across the plate, the result of which construction of the teeth and their arrangement upon the plate is that when the ends of the belt are forced down upon the teeth the teeth will assume the form of hooks, as shown in Figs. 5, 6, and 7, and strain the two ends of the belt in the direction of each other, and the material of each end of it in the direction of its long median line, and thus prevent the ends from spreading laterally and from parting where they join each other on the plate.

When the material of the belt is strong, a single series of teeth on each edge of the plate will be sufficient; but when the material is not of that character two series may be advisable, as shown in Fig. 2.

The teeth are set diagonally to the line of strain upon the belt when in use, and hence their broad sides present a greater resisting surface to the material of the same, and their side edges do not cut across and weaken it to the same extent they would do if they stood squarely across it and in the line of strain upon it.

What I claim as my invention, and desire to secure by Letters Patent, is—

1. The plate A, provided on each of its side edges with series of chisel-formed teeth B, the teeth standing at an inclination to the sides of the plate, the teeth on the two ends having an opposite inclination to each other adapted when the two ends of the belt are driven down upon them to draw the abutting ends of the same together and prevent lateral spreading thereof, substantially as described.

2. In combination with the plate A, having series of chisel-formed teeth on each outer edge thereof, and having the diagonal inclination to said side edges specified, the teeth B, adapted to be bent into the form of hooks in the act of forcing the ends of the belt down upon the same, substantially as described.

EDWARD L. BUDLONG.

Witnesses:
 M. L. THOCKABERRY,
 MACUS KING.